United States Patent Office 2,777,846
Patented Jan. 15, 1957

2,777,846

PROCESS OF PRODUCING MORPHOLINE FROM DIETHANOLAMINE

George Joseph Laemmle, Jr., Austin, Tex., assignor to Jefferson Chemical Company, Inc., New York, N. Y., a corporation of Delaware No Drawing. Application September 27, 1954, Serial No. 458,685

9 Claims. (Cl. 260—247)

This invention relates to the production of morpholine from diethanolamine. All percentages and parts herein are on a weight basis.

Dehydration of diethanolamine employing about 1.8 parts of 66° Baumé sulfuric acid per part of diethanolamine by slowly adding the amine to the acid while agitating and cooling with cold water and then heating the reaction mixture for from 7 to 8 hours at 175° to 180° C. has been suggested. Attempts to increase the reaction rate by increasing the temperature not only require use of superatmospheric pressures because the dilution of the excess free sulfuric acid by the water produced in the reaction results in a rapid decrease in the boiling point of the reaction mixture to a point below 175° to 180° C., but also results in a hot reaction product mixture which is extremely corrosive. This seriously complicates the construction of the reactor. Furthermore, the reaction mixture tends to foam excessively at temperatures above 170° C.

It is among the obects of this invention to provide a process of producing morpholine, which process can be carried out in materially less time than prior known procedures and this without any sacrifice in yield, which process does not present any foaming difficulties and which process entails the handling of a less corrosive reaction product mixture than those produced in the heretofore known sulfuric acid dehydration procedure above pointed out.

Other objects and advantages of this invention will be apparent from the following detailed description thereof.

Surprisingly it has been found that diethanolamine can be efficiently converted to morpholine by employing per part of diethanolamine from 1.0 to 1.8 parts, preferably about 1.2 to 1.7, of oleum desirably containing from 10% to 60% free $SO_3$, preferably about 20% $SO_3$ at a temperature of from about 150° C. to about 250° C., preferably from 180° to 235° C. Employing 1.67 parts of 20% oleum per part of diethanolamine at 190° C., 90% to 95% yields are obtained in a reaction time of only 0.5 hours; at 183° C. using 1.67 parts of 20% oleum per part of diethanolamine a 92% yield is obtained in 1.5 hours. With this invention the reaction time, i. e., the time during which the reaction mixture is maintained at reaction temperature, is preferably within the range of from 0.1 to 2 hours and at reaction temperatures of about 190° C., 0.5 to 1.0 hour.

Since the oleum is anhydrous and contains free $SO_3$, which combines with part of the water produced in the reaction, the acid strength of the reaction product mixture is considerably greater than that obtained with concentrated sulfuric acid. Hence, the reaction rate is increased both by the higher acid strength and by the higher reaction temperature which may be attained under atmospheric pressure without appreciable refluxing when using oleum. Surprisingly, it has been found that the reaction mixture containing oleum does not foam during the reaction and is considerably less corrosive than that resulting from the use of concentrated (66° Bé.) sulfuric acid as the dehydration medium. In carrying out the process of this invention, glass, ceramics and acid-resistant steels such as the high-silicon alloy known as "Duriron" can be used as the material of construction for the reaction vessel.

At the conclusion of the reaction, the morpholine is separated from the reaction product mixture by steam distillation after addition of alkali in amount sufficient to render the mixture strongly alkaline. The resultant aqueous solution of morpholine may be concentrated and/or purified in any known manner.

While it is preferred to carry out the reaction under atmospheric pressure conditions or under a pressure of 2–5 pounds above atmospheric, somewhat higher pressures may be used if desired and the reaction mixture may be refluxed under superatmospheric pressure, the overhead vapors condensed and returned to the reaction mixture. Particularly preferred procedure involves carrying out the reaction at a pressure of 2–5 pounds above atmospheric so that when the reaction is completed, the reaction products may be discharged under this pressure into the neutralizer without requiring the use of pumps for effecting flow of the reaction products from the reaction zone to the neutralization zone.

In order to avoid charring of the diethanolamine, particularly when employing the higher concentration of oleum within the range above noted, the acid and amine is preferably added in separate streams to a body of reaction mixture which is vigorously agitated continuously, and from which body products of reaction are continuously withdrawn, after a residence time in the reaction zone sufficient for the diethanolamine to have been converted to morpholine. The reaction may be carried out continuously or batchwise. If batchwise, the acid and amine are added in separate streams while vigorously stirring the mixture thus produced, thus minimizing the possibility of charring the amine.

Within the range of oleum strength and ratio of reactants above noted, in the preferred embodiment of this invention, the acid strength is chosen, taking into account the water content, if any, of the diethanolamine and the fact that one mol of water is formed from each mol of diethanolamine converted to morpholine, so that the final acid strength of the reaction mixture withdrawn from the reaction zone, i. e., the final acid strength when all of the diethanolamine has been converted to morpholine, is from about 90% to about 100%. This not only permits short reaction times under the temperature conditions above noted but also minimizes corrosion problems. Furthermore, the higher the concentration of the oleum initially used, the less total acid is needed to give the final acid concentration of 90–100 percent $H_2SO_4$ and hence the less alkali is required for the eventual neutralization of this acid.

The following examples illustrate the invention, but they are not to be regarded as limiting it in any way.

In the first two of these examples 1.67 parts of 20% oleum are employed per part of diethanolamine and the diethanolamine is added to the oleum while stirring and cooling the reaction mixture. In each example the reaction is carried out under essentially atmospheric pressure conditions.

*Example 1*

The diethanolamine is added over a period of 20–30 minutes and the maximum temperature of the reaction mixture encountered during the addition is 75° C. Upon addition of all of the diethanolamine the reaction mixture is heated to from 182° to 185° C. and maintained at this temperature for 0.5 hour. At the end of 0.5 hour a sample of the reaction mixture is transferred by suction to a trap and this sample run into 33.3% sodium hydroxide using a 65% excess of sodium hydroxide above the amount required to neutralize the acid present. The alkaline slurry thus produced is distilled to yield morpholine as a dilute aqueous solution. The distillate thus obtained is analyzed to determine its morpholine content and the yield of morpholine calculated from the analytical data thus obtained. The sample obtained after 0.5 hour holding time of the reaction mixture showed that a 90.5% yield of morpholine is obtained in this time. By increasing the holding time of the reaction mixture at the reaction temperature of 182° to 185° C. to 1.5 hours a yield of 92.2% morpholine is obtained and with a holding time of 2 hours at this reaction temperature a yield of 92.8% morpholine is obtained.

*Example II*

This example differs from Example I above in that the reaction mixture after addition of the diethanolamine, which requires 20–30 minutes, is maintained at a reaction temperature of 190° C. for 0.5 hour. A yield of 93.6% morpholine is obtained.

*Example III*

Diethanolamine and 20% oleum are passed continuously into a jacketed reactor at rates of 42.2 and 68.6 pounds per hour, respectively, while stirring continuously the reaction mixture thus produced. Thus 1.63 parts of oleum are supplied per part of amine. The temperature of the reaction mixture is maintained at about 200°–235° C. by regulation of the flow of cooling fluid to the reactor jacket. Average residence time of the reactants in the reactor is ½ hour. The reacted mixture (which contains morpholine acid sulfate and sulfuric acid) passes to a neutralizer where it is treated with 30% NaOH at the rate of 322 pounds per hour. The neutralized product, containing morpholine, sodium sulfate, and excess sodium hydroxide, is then passed to a continuous steam-distillation column from which morpholine is taken overhead at a rate of 33.4 pounds per hour admixed with about four times its weight of water. This represents a yield of about 95% on the basis of the diethanolamine charged.

*Example IV*

Diethanolamine and 20% oleum are passed continuously in separate streams into a jacketed glass-lined reactor provided with an agitator, at rates of 170 and 226 pounds per hour, respectively. Thus 1.33 parts of oleum are supplied per part of amine. The reaction mixture is stirred continuously while the separate streams of the reactants are fed thereto. The temperature is maintained between 180°–210° C. by circulation of cooling fluid through the jacket. Average residence time is ½ hour. The reacted mixture is forced by a nitrogen pressure of about 2 pounds per square inch gauge to flow through a dip tube into a neutralizer provided with a drain and with a vapor line leading to a condenser. Simultaneously 895 pounds per hour of 35% sodium hydroxide is introduced into this neutralizer, and 591 pounds of condensate containing 126 pounds of morpholine are recovered per hour. This represents a yield of about 90% on the basis of the diethanolamine charged.

A slurry of sodium sulfate and aqueous sodium hydroxide is withdrawn from the base of the neutralizer, and filtered.

The filtrate is essentially 35% sodium hydroxide and is returned for use in the neutralization step. The filter cake consists of sodium sulfate wetted with the sodium hydroxide solution and is a salable by-product.

It will be noted this invention permits the reduction of the holding time of the reaction mixture to as little as 30 minutes and still obtain high yields of the order of 94% of morpholine without the use of pressure and without refluxing the reaction mixture. No operating difficulties are experienced using oleum; the heat produced upon addition of the amine to the acid is substantially the same as that when employing concentrated (66° Bé.) sulfuric acid. The troublesome formation of foam during the reaction, which takes place when employing concentrated sulfuric acid, does not occur with oleum. Furthermore, oleum is relatively noncorrosive and the reaction mixture resulting when using oleum is substantially less corrosive than that obtained when employing concentrated sulfuric acid. Moreover, this invention tends to minimize the formation of by-products probably because of the materially shorter reaction time.

It is to be understood that this invention is not restricted to the present disclosure otherwise than as defined by the appended claims.

What is claimed is:

1. The process of producing morpholine from diethanolamine, which comprises mixing the diethanolamine with oleum and heating the reaction mixture to convert the diethanolamine to morpholine.

2. The process of producing morpholine from diethanolamine, which comprises mixing diethanolamine with oleum containing from 10% to 60% free $SO_3$ in the proportions of from 1.0 to 1.8 parts of oleum per part of diethanolamine, and heating the reaction mixture to a temperature of from 150° to 250° C. to convert the diethanolamine to morpholine.

3. The process as defined in claim 2, in which the oleum is of a concentration within the range specified such as to result in a reaction mixture containing sulfuric acid having a concentration of from 90% to 100%.

4. The process as defined in claim 2 in which the oleum and diethanolamine are supplied to the reaction mixture in separate streams while vigorously agitating the reaction mixture and the oleum is of a concentration within the range specified such as to result in a reaction mixture containing sulfuric acid having a concentration of from 90% to 100%.

5. The process as defined in claim 2, in which the reaction mixture is maintained at 180° to 235° C.

6. The process as defined in claim 2, in which the reaction mixture is maintained at from 180° to 235° C. for from about 0.1 to 2 hours.

7. The process of producing morpholine from diethanolamine, which comprises mixing from 1.2 to 1.7 parts of 20% oleum per part of diethanolamine and heating the reaction mixture to from about 180° to 235° C. for from about 0.5 to 1 hour to convert the diethanolamine to morpholine.

8. In a continuous process for the manufacture of morpholine from diethanolamine employing an agitated reaction mixture of diethanolamine and oleum containing 10% of 60% free $SO_3$, said reaction mixture having the proportions of 1.0 to 1.8 parts of oleum per part of diethanolamine and being maintained at a temperature between about 150° to 250° C., the step which comprises adding separate streams of oleum and diethanolamine to said reaction mixture while maintaining said oleum at a concentration within the range specified such as to result in a reaction mixture containing sulfuric acid having a concentration of from 90% to 100%.

9. The process of producing morpholine from diethanolamine which comprises reacting diethanolamine with oleum containing 10% to 60% free $SO_3$ to convert said diethanolamine to morpholine.

References Cited in the file of this patent

UNITED STATES PATENTS 615,488    Knorr _____ Dec. 6, 1898